United States Patent
Walker

[11] Patent Number: 5,901,112
[45] Date of Patent: May 4, 1999

[54] SIGNAL ENERGY ENHANCEMENT FOR SEISMIC EXPLORATION

[76] Inventor: David A. Walker, P.O. Box 1344, Bartlesville, Okla. 74005

[21] Appl. No.: 08/226,164

[22] Filed: Apr. 11, 1994

[51] Int. Cl.$^6$ ............................ G01V 1/28; G01V 1/36
[52] U.S. Cl. ............................ 367/46; 367/41; 364/421
[58] Field of Search ................... 367/40, 41, 42, 367/46, 189, 190; 364/421

[56] References Cited

U.S. PATENT DOCUMENTS

| | | | |
|---|---|---|---|
| 2,688,124 | 8/1954 | Doty et al. | 340/15 |
| 4,049,077 | 9/1977 | Mifsud | 181/114 |
| 4,646,274 | 2/1987 | Martinez | 367/41 |
| 4,691,326 | 9/1987 | Tsuchiya | 375/1 |
| 4,899,321 | 2/1990 | Solanki | 367/48 |
| 5,134,590 | 7/1992 | Garotta | 367/38 |
| 5,150,331 | 9/1992 | Harris et al. | 367/50 |

OTHER PUBLICATIONS

Anstey, N.A., "Correlation Techniques—A Review", Geophysical Prospecting, vol. XII, No. 4, 1964.
Robinson, E.A., et al., "Principals of Digital Wiener Filtering", Geophysical Prospecting, vol. XV, No. 3, Sep. 1967.

*Primary Examiner*—Nelson Moskowitz
*Attorney, Agent, or Firm*—George E. Bogatie

[57] ABSTRACT

Harmonics, which appear with seismic reflection signals and are responsive to actual vibrations of a land-vibrator for petroleum exploration, are effectively utilized in pulse compression techniques by applying a correlation operator (CO) signal representative of the actual vibrations injected into the earth. In the invention, the CO signal may be acquired by detecting the motion of the baseplate of the land vibrator. Signal correlation procedures are then used to define an inverse filter whose output is pulse-like in response to the CO signal, and the reflected signal is applied to the inverse filter to yield a pulse compressed signal including harmonic energy.

7 Claims, 4 Drawing Sheets

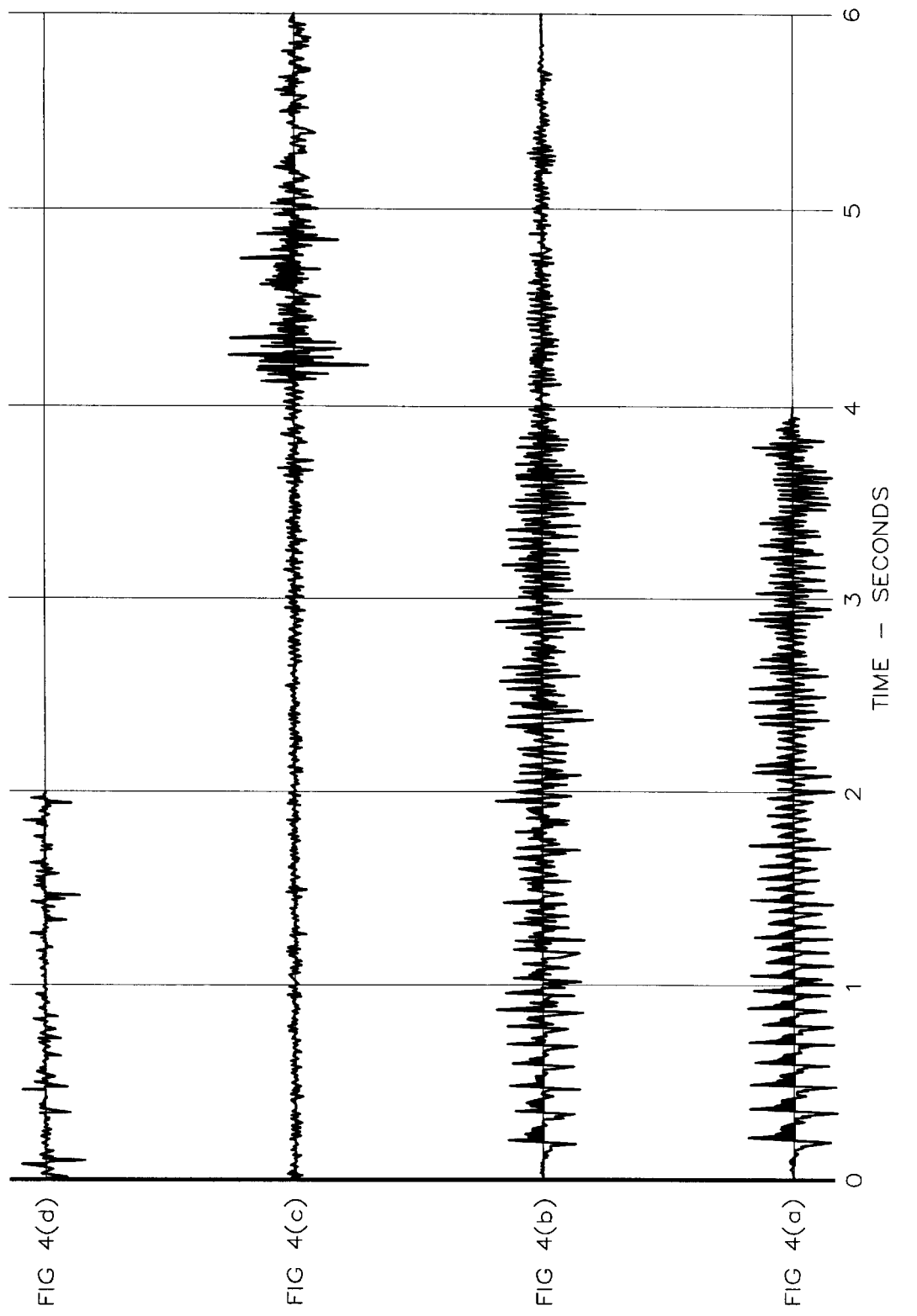

SIGNAL ENERGY ENHANCEMENT FOR SEISMIC EXPLORATION

This invention relates generally to seismic acoustic wave system for geophysical surveys. More specifically this invention relates to method and apparatus for enhancing seismic reflection signals by correlation techniques.

BACKGROUND OF THE INVENTION

Numerous techniques for exploring the earth to acquire geophysical data are well known. Seismic surveys, however, are the best and most definitive geophysical means of structural representation currently in use. In some instances, seismic data can provide nearly direct indication of oil or gas. These indications, however, are very specialized and are intimately related to very local geological conditions. Reflection type seismic surveys are most common. In these reflection surveys seismic waves are induced in solid earth, reflected back to the surface by subsurface strata where the reflected waves are detected by a group of spaced apart receivers called geophones, and seismic signals representative of the detected waves are processed to form images of the subsurface.

Seismic exploration utilizes an acoustic source such as a dynamite explosion or a land vibrator to induce a seismic wave. The measured travel time of the seismic wave from the source to a receiver is used to produce a field record. Variations in travel time of acoustic waves produce time related field records that indicate the position of reflection surfaces, and correlation of a group of field records from appropriately spaced apart receivers produce a cross section that demonstrates the subsurface structure.

In practice, the detectability of a seismic signal representative of a reflected wave is limited by the energy of the received wave i.e. that is, by the product of its average power and its duration. Accordingly, many seismic systems utilize a relatively long pilot signal such as 3 to 15 seconds to drive a land vibrator to assure that high seismic wave energy is imparted into the earth, and then compress the long reflection signal to a short pulse to assure good resolution. This principle is known as pulse compression, and is achieved through cross-correlation of the received signal against the pilot signal.

Correlation techniques are well described e.g. in N. A. Anstey, "Correlation Techniques—A Review", Geophysical Prospecting, Vol. XII, No. 4, 1964. In simplified terms correlation techniques identify the presence of a seismic reflection in the time domain based on the sum obtained from the well known cross-correlation technique, i.e. solving the equation:

$$\phi_{gr}(\tau) = \frac{1}{T}\int_O^T r(t)g(t-\tau)dt$$

where g (t–τ) is an input sweep signal delayed by an amount (τ) and where r(t) is the measured reflection signal. In effect the pilot signal is "overlayed" onto the reflection signal at incremental delay times τ; at such delay times as the area under the curve representative of the above product is a maximum, the delay time equals the travel time of the reflected signal i.e. a two-way time is identified. Assuming that the wave velocities in the subsurface strata are known, the depth of the associated reflecting subsurface strata interface can be determined.

A land vibrator, 10 in FIG. 1, uses a pulse compressive method of seismic exploration known commercially as VIBROSEIS®. This system utilizes a reference or so called pilot sweep of sinusoidal signals of varying frequency, of selected band width and of selected time duration as illustrated in FIG. 2(A) to control injection of seismic acoustic waves into the earth. For example the sinusoidal frequency may vary from 10 to 48 hertz during a 4 second period in which the seismic energy is imparted at the surface of the earth.

In operating land vibrator exploration systems, energy is transmitted by vibrating a baseplate 12 in FIG. 1, which is large mass coupled to the solid earth and may be of the type mounted on a land vehicle, such that the vibrating plate 12 placed on the ground 14 is mechanically coupled to the earth by the weight of the entire vehicle. A hydraulic circuit 16 acts on reaction mass 18 causing the baseplate 12 to vibrate. At rest a mechanical system (not shown) serves to put the vehicle close to a limiting position where its supporting wheels leave the ground, at which point the ground 14 beneath the baseplate 12 is subjected to a constant force due to the overall weight of the generator and the vehicle carrying it. Since the vehicle should not be subjected to the vibrations generated by hydraulic circuit 16, the vehicle is decoupled from the baseplate 18 by shock absorbers such as conventional air bags, 20 and 22.

In operation, the pressure of fluid in the hydraulic circuit 16 is modulated as a function of time to comply with variations imposed by a "pilot" signal 24, which is shown in greater detail in the waveform of FIG. 2(a). The pilot signal is an alternating signal having a frequency which is continuously varying between limiting frequencies, and is applied to the hydraulic circuit 16 by any suitable means.

A recording sequence generally begins when emission of the wave starts, and it stops only after a period equal to the duration of the emission plus an idle period corresponding to the time taken for the waves to reach and travel back from the deepest reflector of interest between the emission and reception points. Various schemes have been employed to insure that the energy imparted into the earth is in phase with the long pilot signal used to drive the land vibrator so that the cross-correlation technique is effective for pulse compression. For example phase locking techniques are known where the pilot signal is phase locked to a signal generated by the land vibrator to maintain the seismic energy in phase with the pilot signal.

While these schemes have been generally successful for detecting energy contained in reflected seismic waves, a difficulty is encountered in cross-correlating a slowly varying sine wave that is injected into the earth and the reflected signal, in that harmonic energy may be present in both directions on the time shift axis of the correlation curve. These harmonics, which are in a large part non-repeating, represent a significant portion of the injected energy and in some cases mask small reflection signals. A land vibrator seismic system utilizing a reference signal for correlation against a received signal that does not require phase coherence with the pilot signal and that further could detect reflected harmonic energy would be highly desirable.

As used herein a correlation operator (CO) is a signal representative of the actual dynamics of the transmitted seismic energy injected into the earth by a land vibrator. This signal may be obtained, for example, from transducers which sense the motion of the vibrating baseplate of the land vibrator.

It is an object of this invention to utilize a reference signal for pulse compression of a received signal that does not require maintenance of phase relationship with the pilot signal.

It is another object of this invention to effectively utilize received harmonic energy.

It is a further object of this invention to increase the signal energy that is recovered in seismic systems that employ a long pilot signal.

It is a still further object of this invention to suppress interference caused by harmonic signal energy.

Additional objects, advantages and novel features of this invention will be apparent in the description which follows and in the appended claims and in the drawings.

BRIEF SUMMARY OF THE INVENTION

A method of enhancing a seismic reflection signal containing harmonics comprises recording a correlation operator (CO) signal which is representative of the actual transmitted seismic energy imparted into the earth, determining an inverse filter whose output is an ideal pulse in response to the CO signal, and passing the received seismic reflection signal through the inverse filter to yield a pulse compressed signal which includes harmonic energy. In accordance with one aspect of the invention the baseplate of a land vibrator is driven in response to a sinusoidal pilot signal of continuously varying frequency that varies from about 10 hertz to about 90 hertz over a ten second interval to transmit the seismic energy, and the CO signal is acquired by detecting motion of the baseplate of the land vibrator.

In another aspect of the invention, apparatus for enhancing a seismic reflection signal containing harmonics comprises means for detecting a CO signal, a group of recording devices for seismic signals, and computer means programmed for storing the CO signal and the received signal in memory, determining an inverse filter whose output is an ideal pulse in response to the CO signal, and filtering the received signal with the inverse filter to yield a pulse compressed signal including harmonic energy.

The method and apparatus of the invention, using the inverse filter, thus effectively detects reflected seismic waves relative to a reference signal that does not require maintenance of phase correspondence with the pilot signal, and further provides a filter having a pass band that includes harmonics associated with land-vibrator seismic system.

BRIEF DESCRIPTION OF THE DRAWINGS

FIG. 4(A) illustrates a typical waveform having harmonic content detected by an actual transducer 32 shown in FIG. 1.

FIG. 4(B) illustrates a typical waveform containing harmonics, detected by an actual geophone sensor shown in FIG. 1.

FIG. 4(C) illustrates a typical waveform for the inverse correlation filter defined in FIG. 3.

FIG. 4(D) illustrates a seismic reflection shown in FIG. 4(B) passed through the inverse correlation filter shown in FIG. 4(C).

DETAILED DESCRIPTION OF THE PREFERRED EMBODIMENT OF THE INVENTION

Figure 1:
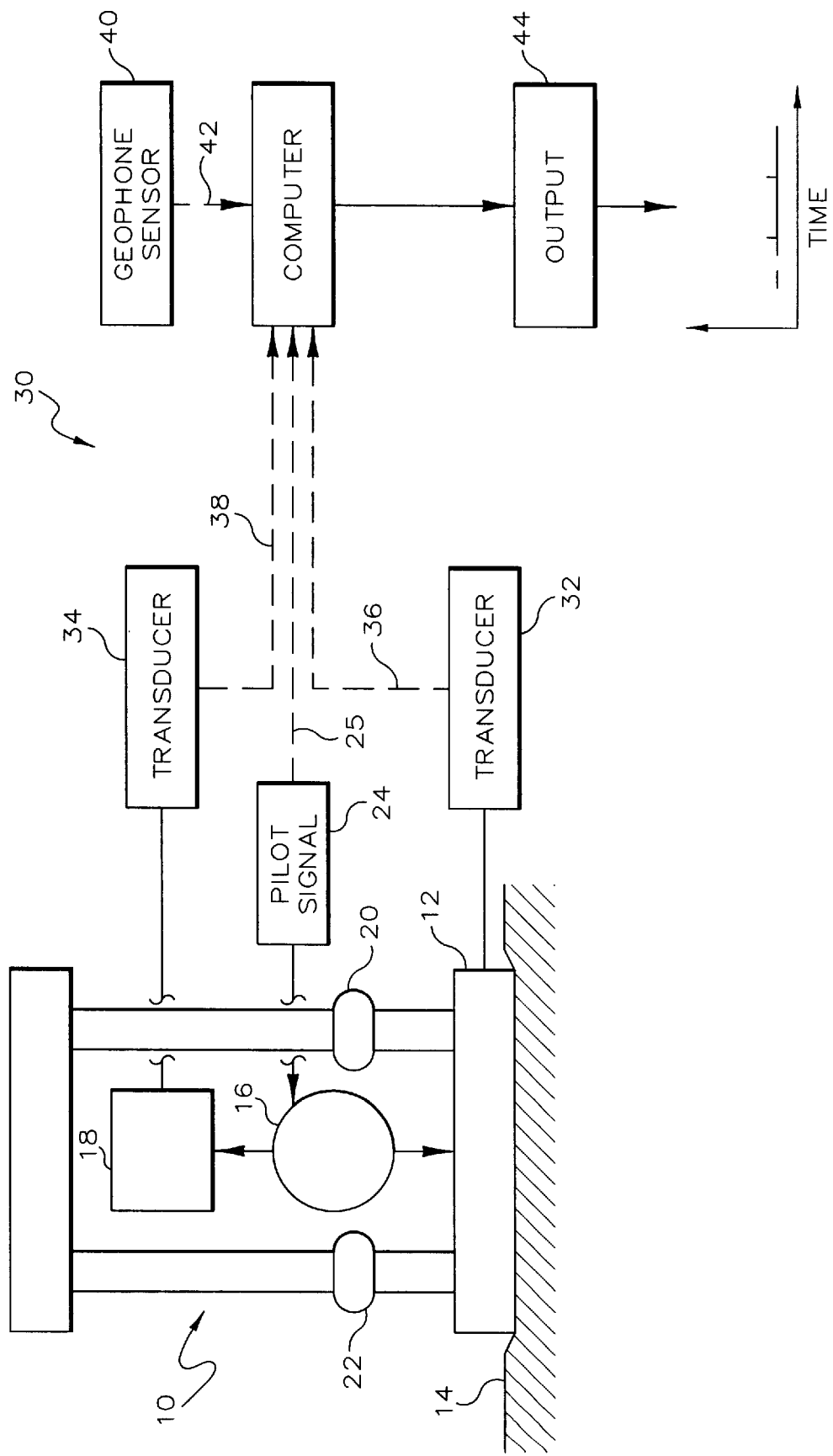
FIG. 1 illustrates a land vibrator seismic system for petroleum exploration.

Referring now to the drawings in more detail, there is shown, generally at 30 in FIG. 1, the sensing and computing apparatus for use in this invention. The computer 100 is connected to land vibrator 10 through transducers 32 and 34, which e.g. may be accelerometers, to receive signals indicative of the motion of the baseplate 12 and reaction mass 18 respectively. The computer 100 is further connected to geophone sensor 40 to receive a signal indicative of seismic reflections via signal line 42. It is noted that computer 100 is programmed to perform inverse correlation calculations that yield a digitally calculated filter and further programmed to provide an output 44 in the form of graphs of correlated signal as will be more fully described hereinafter.

Preferably the CO signal is acquired from transducer 32 which provides a signal representative of the motion of the baseplate 12 on signal line 36. Optionally the CO signal may be acquired by combining signals representative of the motion of baseplate 12 on signal line 36 and the reaction mass 18 on signal line 38.

Figure 2:
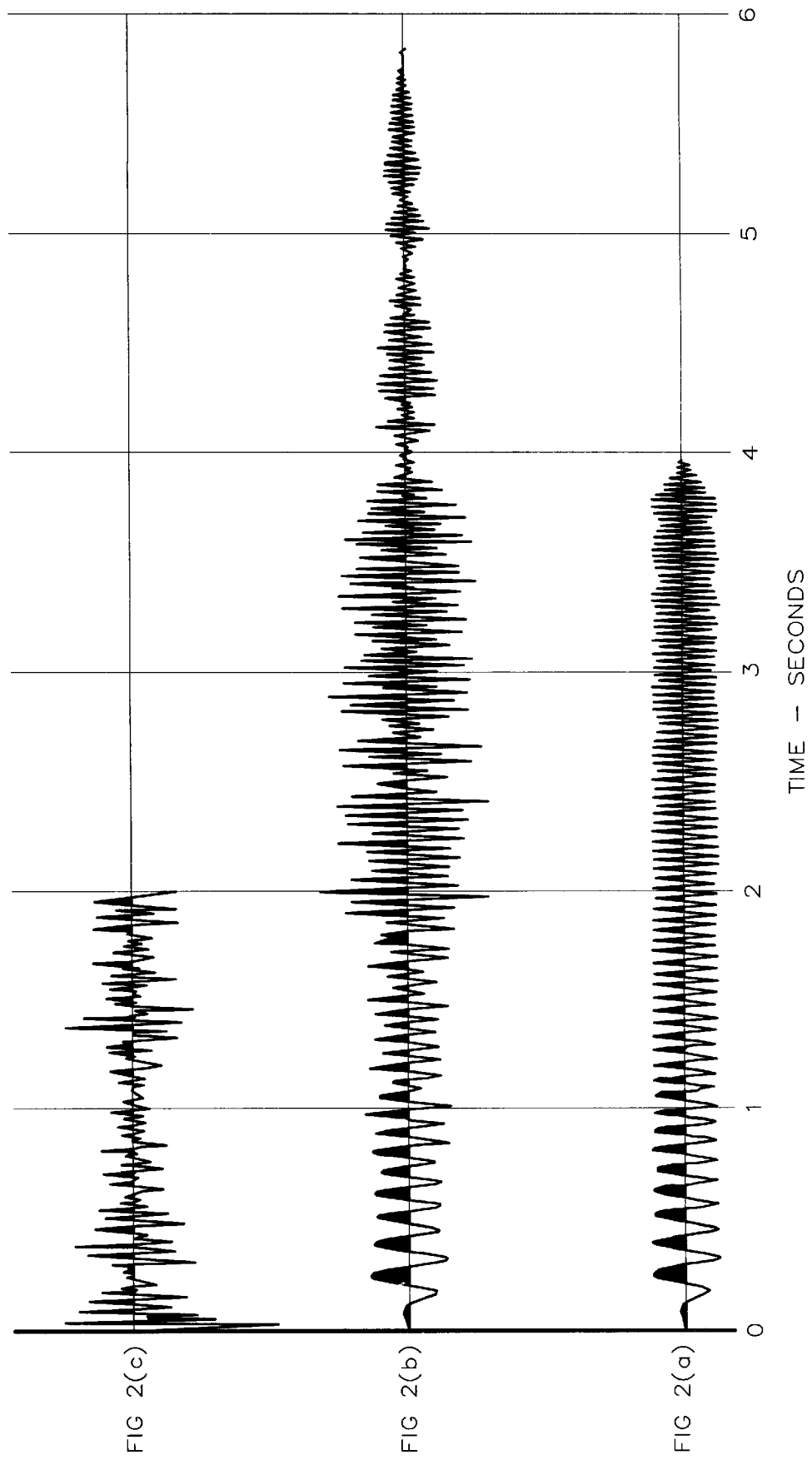
FIG. 2(A) illustrates a typical waveform without harmonic content, associated with the pilot sweep in FIG. 1.
FIG. 2(B) illustrates a typical waveform detected by an actual geophone sensor shown in FIG. 1.
FIG. 2(C) illustrates the seismic reflection signal of FIG. 2(B) correlated against the waveform of FIG. 2(A).

Referring now to FIGS. 2(a)–2(c) there is illustrated simulated waveforms which show a prior art method of pulse compression for reflections of long seismic signals. FIG. 2(a) illustrates a waveform of a pilot sweep signal 24 employed to drive the baseplate 12 in FIG. 1. This signal, by way of example only, varies from 10 to 40 hertz over a 4 second period and accordingly has a bandwidth limited between frequencies of 10 and 40 hertz. If the response of baseplate 12 to the pilot signal 24 were perfect, the pilot signal 24 would be representative of the seismic waves energy injected into the earth by baseplate 12. The received seismic reflection signal as provided on signal line 42 from geophone sensor 40 is illustrated in FIG. 2(b). While the receive signal on line 42 is of the same general shape of the pilot signal on line 25, it is contaminated by noise and further has a harmonic content that is not present in the pilot signal 24. The result of cross-correlation of the signals present on lines 25 and 42 of FIG. 1 is illustrated in FIG. 2(c).

Figure 3:
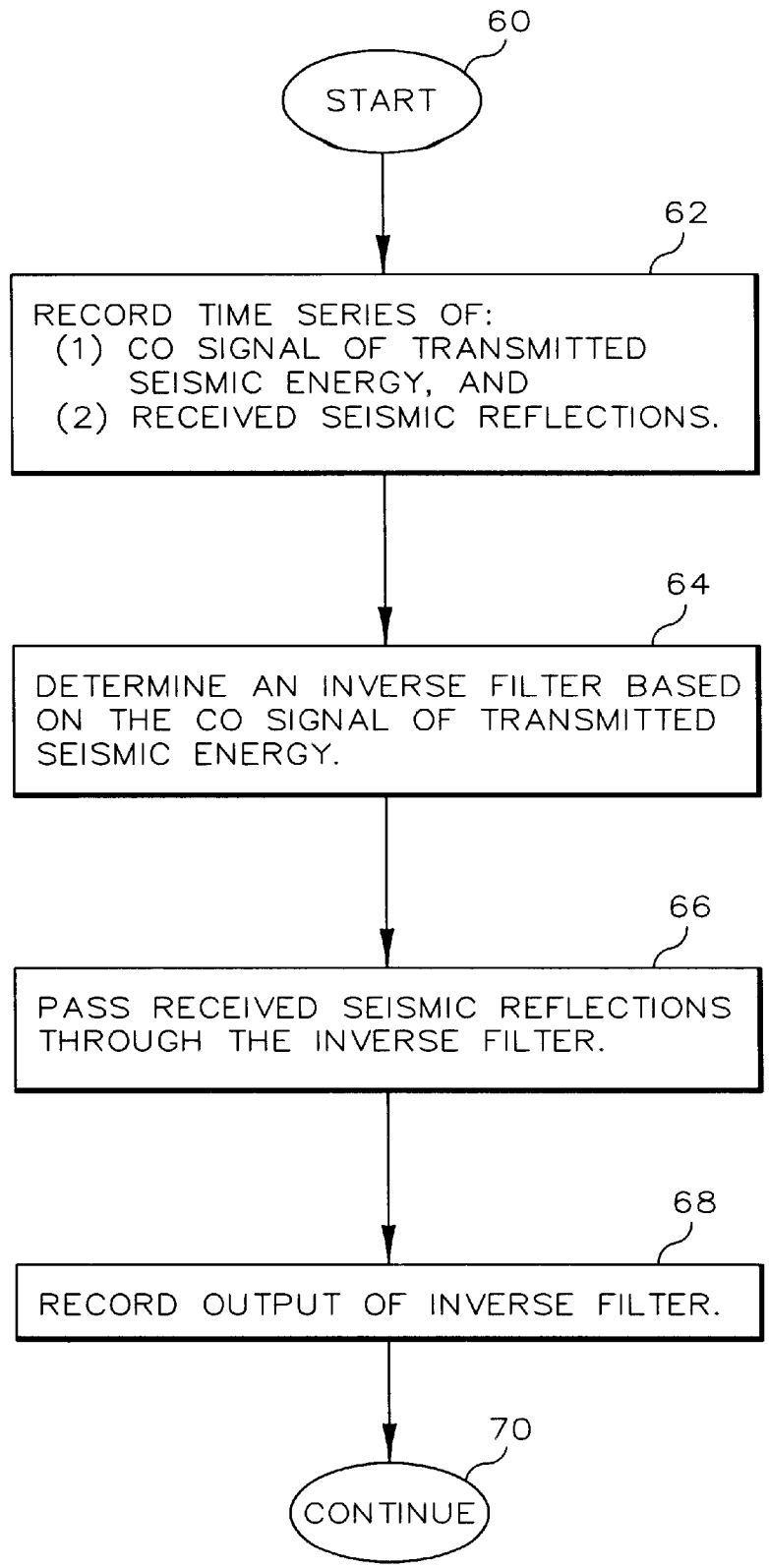
FIG. 3 is a computer software flow chart illustrating a method performed by the apparatus of FIG. 1 according to this invention.

Referring now to FIG. 3 there is illustrated a simplified computer software flow diagram for pulse compression of seismic signals according to this invention. The computer is rendered operative at a start step 60 when the land vibrator is activated. In the preferred embodiment the computer is programmed at step 62 to record the time series signals of the seismic energy imparted into the earth (previously defined as the CO signal) as represented by the signal carried on signal line 36 of FIG. 1 which is illustrated in FIG. 4(a). Also recorded is the reflected seismic energy as represented by the signal carried on signal line 42 of FIG. 1 and as illustrated in FIG. 4(b).

Next the computer precedes to step 64 to determine an inverse filter matched to the CO signal. The function used in step 64 to determine an inverse filter is defined as:

CO ⊛ $[F]^{-1}$ = ideal pulse where:

ideal pulse = a highly compressed broadband wavelet possessing desired characteristics CO = correlation operator $[F]^{-1}$ = inverse filter function The waveform of the filter $[F]^{-1}$ determined in step 64 is illustrated in FIG. 4(c). After the inverse filter $[F]^{-1}$ is determined in step 64 the previously recorded seismic reflection signal FIG. 4(b) is cross-correlated with the filter function of FIG. 4(c), or equivalently the reflection signal of FIG. 4(b) is passed through the inverse filter to yield the correlated signal illustrated in FIG. 4(d). In step 68 the output of the inverse filter is recorded for use in constructing a cross section of the subsurface structure. Comparison of the waveform shown in FIG. 2(c) and FIG. 4(d) illustrates significantly better definition of pulses compressed from long reflection signals using the correlation techniques of the present invention.

The numerical calculation for correlation of waveforms has been well established. Over the years a number of digital computer programs have been developed which facilitate the correlation calculations. Actual design criteria and computational procedures needed to obtain the filters for seismic analysis are well described by E. A. Robinson, et al "Principals of Digital Wiener Filtering", Geophysical Prospecting, Vol. XV, No. 3, Sept. 1967, incorporated herein by reference.

While this invention has been described in terms of its presently preferred embodiment, it is to be understood that the invention may find application in various other environments. Accordingly, reasonable modifications and variations of the invention, which are possible by those skilled in the art, are also considered to be within the scope of the foregoing description and the appended claims.

That which is claimed:

1. A method of enhancing a seismic reflection signal received from a land-vibrator seismic system, which includes a baseplate coupled to the earth to induce seismic waves of varying frequencies, into the earth, said method comprising:

(a) recording a correlation operator (CO) signal which is representative of the actual motion of said baseplate and includes harmonics associated with said land vibrator system;

(b) determining an inverse filter responsive to said CO signal, said inverse filter having a pass-band that includes harmonics which are associated with said land vibrator seismic system; and (c) passing said seismic reflection signal through said inverse filter to yield a pulse compressed seismic signal which includes harmonic energy injected into the earth by said land-vibrator seismic system.

2. Apparatus for enhancing a seismic reflection signal received from a land-vibrator seismic system, which includes a baseplate coupled to the earth to induce seismic waves of varying frequencies into the earth, said apparatus comprising:

(a) means for establishing a correlation operator (CO) signal representative of the actual motion of said baseplate and includes harmonics injected into the earth by said land vibrator system;

(b) at least one geophone for detecting said seismic reflection;

(c) a computer connected to said means for establishing said CO signal and said geophone, said computer being programmed for:

i. recording said CO signal and said seismic reflection signal;

ii. determining an inverse filter responsive to said CO signal, said inverse filter having a pass-band that includes harmonics which are associated with said land vibrator seismic system; and iii. passing said seismic reflection signal through said inverse filter to yield a pulse-compressed seismic signal which includes harmonic energy injected into the earth by said land-vibrator system.

3. A method in accordance with claim 1, wherein said step of detecting motion of said baseplate comprises:

detecting the acceleration of said baseplate.

4. A method in accordance with claim 1, wherein said land vibrator including said baseplate and a reaction mass for imparting seismic energy into the earth to produce said seismic reflection, said method additionally comprising:

detecting the motion of said reaction mass.

5. A method in accordance with claim 1, wherein said pilot signal is a sinusoidal signal of continuously varying frequency that varies from about 10 to about 90 hertz over a ten second period.

6. A method in accordance with claim 1, wherein said inverse filter is completely defined in terms of said CO signal and said ideal pulse.

7. Apparatus in accordance with claim 2, wherein said means for detecting the motion of said baseplate comprises:

an acceleration sensor securely attached to said baseplate for providing an acceleration signal; and means for imputing said acceleration signal into said computer.

\* \* \* \* \*